United States Patent [19]

McFarlane et al.

[11] 3,890,256
[45] June 17, 1975

[54] COPOLYESTER PREPARED BY CONTACTING ACYLOXY BENZOIC ACID WITH A POLYESTER OF ETHYLENE GLYCOL AND DICARBOXYLIC ACID

[75] Inventors: Finley E. McFarlane; Thomas G. Davis, both of Kingsport, Tenn.

[73] Assignee: Eastman Kodak Company, Rochester, N.Y.

[22] Filed: June 7, 1974

[21] Appl. No.: 477,381

[52] U.S. Cl. ...... 260/47 C; 117/161 K; 260/33.4 P; 260/33.8 R
[51] Int. Cl........................ C08g 17/02; C08g 17/08
[58] Field of Search ................................. 260/47 C

[56] References Cited
UNITED STATES PATENTS

| | | | |
|---|---|---|---|
| 3,288,755 | 11/1966 | Grichl et al............................ | 260/47 |
| 3,345,331 | 10/1967 | Resse, Jr................................ | 260/47 |
| 3,637,595 | 1/1972 | Cottis et al. .......................... | 260/47 |
| 3,662,052 | 5/1972 | Nowak et al......................... | 264/119 |
| 3,759,870 | 9/1973 | Economy et al...................... | 260/47 |
| 3,772,405 | 11/1973 | Hamb .................................... | 260/860 |
| 3,778,410 | 12/1973 | Kuhfuss et al. ....................... | 260/47 |
| 3,790,528 | 2/1974 | Tesaki et al. ......................... | 260/47 |
| 3,804,805 | 4/1974 | Kuhfuss et al. ....................... | 260/47 |

*Primary Examiner*—Lester L. Lee
*Attorney, Agent, or Firm*—Charles R. Martin

[57] ABSTRACT

Disclosed is a copolyester having no substantial amount of either aliphatic to aromatic oxygen linkages or aromatic to aromatic oxygen linkages, the copolyester being comprised of the following divalent radicals:

(A) $-\overset{O}{\underset{}{C}}-$ Organic Radical $-\overset{O}{\underset{}{C}}-$ (B) $-OCH_2CH_2O-$ (C)

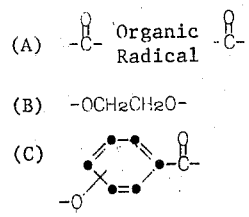

(D) $-O-R_2-O-$ , wherein $R_2$ is a carbocyclic aromatic nucleus wherein the chain extending oxygen linkages are coaxial or parallel and are oppositely directed, the range of radical (C) plus radical (D) is from about 30 to about 75 mole percent, based on the total moles of radical (B), radical (C) and radical (D) combined, and the amount of radical (D) is not greater than 30 mole percent, based on the total moles of radical (B), radical (C) and radical (D) combined. The copolyesters of this invention are prepared by a process comprised of two steps. The first step comprises forming a fragmented polyester by acidolysis of a starting polyester with an acyloxy benzoic acid in the presence of a dicarboxylic acid corresponding to radical (A) and a diol corresponding to radical (D). The second step comprises increasing the inherent viscosity of the fragmented polyester to form the copolyester of the invention. The starting polyester is formed from a dicarboxylic acid corresponding to radical (A) and ethylene glycol corresponding to radical (B) and contains a repeating unit composed of radical (A) attached to radical (B). When the acyloxy benzoic acid and starting polyester are contacted in the presence of a dicarboxylic acid corresponding to radical (A), and a diol corresponding to radical (D), acidolysis occurs and a fragmented polyester is formed. The inherent viscosity of the fragmented polyester is then increased to form the copolyester of the invention comprised of radicals (A), (B), (C) and (D). Radical (A) of the copolyester is contributed from the dicarboxylic acid portion of the starting plyester and the quantity of dicarboxylic acid used in preparing the copolyester of the invention, radical (B) of the copolyester is contributed from the ethylene glycol portion of the starting polyester, radical (C) is contributed from the acyloxy benzoic acid, and the aromatic diol contributes radical (D) to the copolyester. Radical (C) will be recognized as the radical remaining after removal of the acyl and hydroxy groups from the acyloxy benzoic acid. The copolyesters of this invention exhibit unobvious mechanical properties.

8 Claims, 3 Drawing Figures

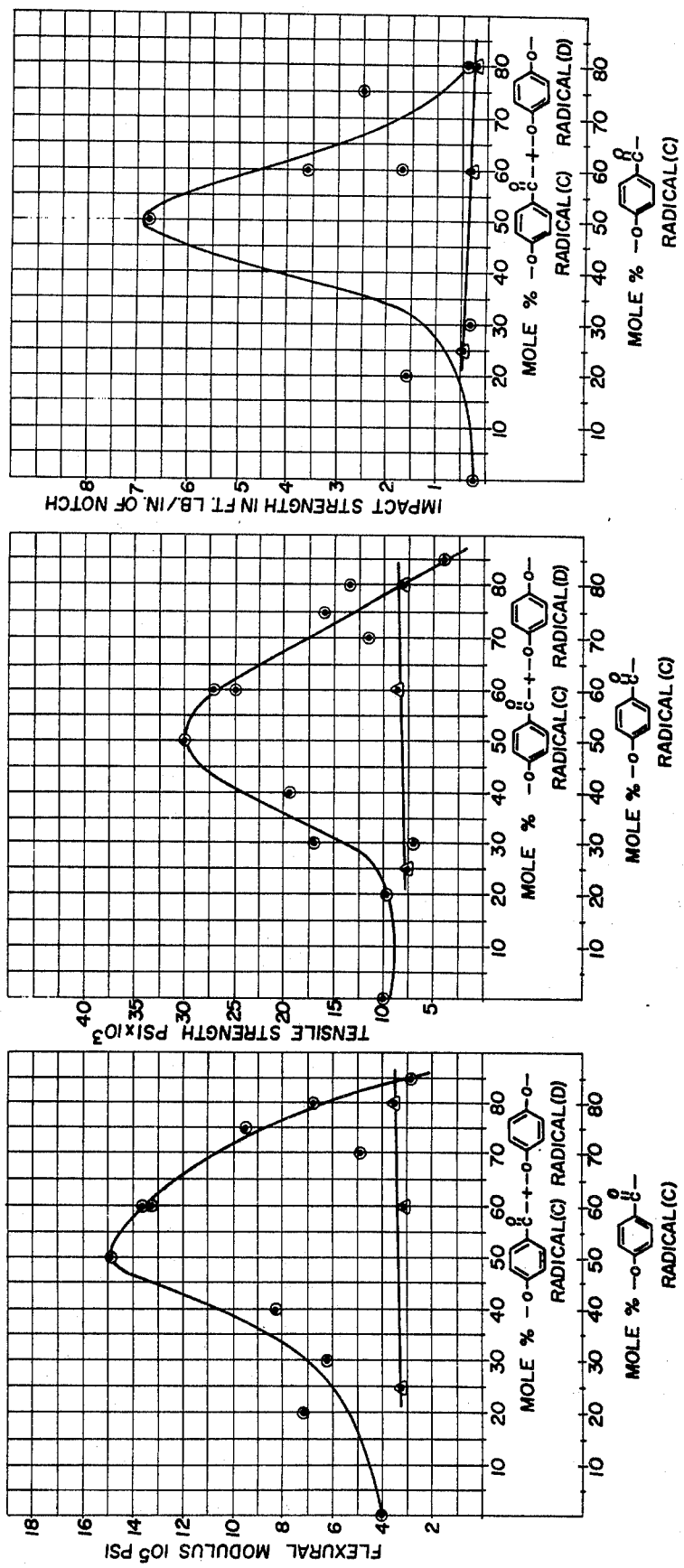

COPOLYESTER PREPARED BY CONTACTING ACYLOXY BENZOIC ACID WITH A POLYESTER OF ETHYLENE GLYCOL AND DICARBOXYLIC ACID

This invention relates to a copolyester which exhibits the combination of unobviously high flexural modulus, unobviously high tensile strength and unobviously high impact strength.

The use of objects molded from synthetic polymers has expanded rapidly in the last several decades. In particular, certain synthetic polymers, including polyesters, have gained acceptance for molding objects that will be subjected to high strength service. These synthetic polymers have mechanical properties sufficiently high that in some cases permit objects molded of these polymers to be substituted for objects formed from much stronger materials, such as ceramic and metallic materials.

Although many polyesters have mechanical properties that make the polyesters suitable for molding into useful objects, most polyesters are not suitable for high strength service since the mechanical properties of most polyesters are not sufficiently high. A few of the many known polyesters are suitable for high strength service if they are reinforced with a reinforcing agent such as glass fibers.

Applicants have now invented a copolyester that exhibits mechanical properties sufficiently high to make the copolyester suitable for various kinds of high strength service without the necessity of a reinforcing agent.

Very broadly, the copolyester of this invention has no substantial amount of either aliphatic to aromatic oxygen linkages or aromatic to aromatic oxygen linkages and is comprised of the following divalent radicals:

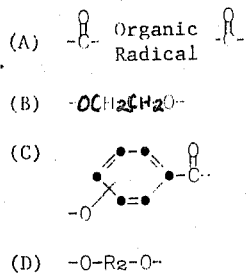

wherein $R_2$ is a carbocyclic aromatic nucleus wherein the chain extending oxygen linkages are coaxial or parallel and are oppositely directed.

The first type prior art that applicants are aware of is prior art directed to conventional polyesters containing p-hydroxybenzoic acid. In this regard, applicants are aware of U.S. Pat. No. 3,228,775; U.S. Pat. No. 3,316,326; U.S. Pat. No. 3,418,276; Canadian Pat. No. 888,788; Canadian Pat. No. 893,194; Canadian Pat. No. 822,194; U.S. Pat. No. 2,728,742; U.S. Pat. No. 2,981,705; U.S. Pat. No. 2,981,706; U.S. Pat. No. 3,054,779; U.S. Pat. No. 2,471,023, Japanese Pat. No. 27485/69, and Japanese Pat. No. 7021811.

The second type of prior art that applicants are aware of is prior art directed to a copolyamide having chain extending bonds from each aromatic nucleus which are coaxial or parallel and oppositely directed. In this regard applicants are aware of U.S. Pat. No. 3,671,542 and U.S. Pat. No. 3,673,143.

The third type of prior art that applicants are aware of is prior art directed to copolyesters containing radicals (A), (B) and (C) as described above. In this regard applicants are aware of U.S. Pat. No. 3,778,410 and U.S. Pat. No. 3,804,805.

Considering now the manner in which the copolyester of this invention differs from the first type of prior art, the copolyester of this invention is literally distinguishable because the structure of the molecular chain of the copolyester of this invention is different from the structure of the molecular chain of similar copolyesters of the first type of prior art. Specifically, the copolyester of this invention has no substantial amount of either aliphatic to aromatic oxygen linkages or aromatic to aromatic oxygen linkages, while copolyesters of the first type of art, such as in Example 1 of U.S. Pat. No. 3,288,755 or Example 2 of Canadian Pat. No. 888,788, contain substantial amounts of aliphatic to aromatic oxygen linkages. If an aromatic diol, such as hydroquinone, is used in place of a portion of the ethylene glycol, aromatic to aromatic oxygen linkages would be formed.

By the term "aliphatic to aromatic oxygen linkage" we mean an arrangement of atoms in the molecular chain of the polyester where a divalent oxygen atom is bonded between an aromatic structure and an aliphatic structure. As an example, consider a copolyester of the prior art formed from terephthalic acid, ethylene glycol and hydroxy benzoic acid. The copolyester will contain

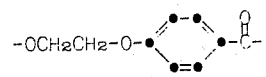

units formed by hydroxy-hydroxy condensation of ethylene glycol and the hydroxy group of the hydroxy benzoic acid. In this situation the aliphatic to aromatic linkages can be represented as

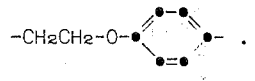

By the term "aromatic to aromatic oxygen linkage" we mean an arrangement of atoms in the molecular chain of the polyester where a divalent oxygen atom is bonded between two aromatic structures. As an example, consider a copolyester of the first type of prior art formed from terephthalic acid, ethylene glycol, hydroquinone and hydroxy benzoic acid. The copolyester will contain

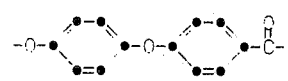

units formed by hydroxy-hydroxy condensation of hydroquinone and the hydroxy group of the hydroxy benzoic acid. In this situation the aromatic to aromatic linkages can be represented as

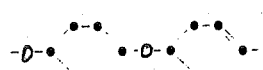

The copolyester of this invention has been described as containing "no substantial amount" of either aliphatic to aromatic oxygen linkages or aromatic to aromatic oxygen linkages. By the term "no substantial amount" we mean that the amount of aliphatic to aromatic or aromatic to aromatic oxygen linkages, if any, is below the detection ability of a 60 MHz Model A-60 Nuclear Magnetic Resonance Spectrometer manufactured by Varian Associates when the copolyesters are dissolved in trifluoroacetic acid. Quantitatively, this means that the amount of aliphatic to aromatic or aromatic to aromatic oxygen linkages, if any, is less than about 3 mole percent. Conversely, by the term "substantial amount" we mean that the amount of either aliphatic to aromatic or aromatic to aromatic oxygen linkages in the copolyesters of the prior art is above the detection ability of the NMR instrument. Quantitatively, this means that the amount of either aliphatic to aromatic or aromatic to aromatic oxygen linkages is more than about 3 mole percent.

The copolyester of this invention is thought to be patentable over the first type of prior art, such as disclosed in U.S. Pat. No. 3,288,755 and Canadian Pat. No. 888,788, because the copolyesters of this invention exhibit mechanical properties that are unobvious over the mechanical properties that one would expect of these copolyesters based on the prior art.

FIGS. 1, 2, and 3 represent graphs of important mechanical properties of both the copolyesters of the prior art and the copolyesters of the invention.

FIG. 1 represents the flexural modulus, or stiffness, of the copolyester of the invention and the flexural modulus of the copolyester of the prior art when the amount of radical (C)

and radical (D)

are varied over a range of 0 to 85 mole percent, based on the total moles of radical (B), radical (C) and radical (D).

FIG. 2 is similar to FIG. 1 but represents the tensile strength of the copolyester of the invention and the tensile strength of the copolyester of the prior art.

FIG. 3 is similar to FIGS. 1 and 2 but represents the impact strength of the copolyester of the invention and the copolyester of the prior art.

The copolyester of the invention, represented in FIGS. 1, 2 and 3 by the correlation between the ordinate and the upper abscissa, is prepared by a procedure to be subsequently disclosed in detail using a polyester of terephthalic acid and ethylene glycol, additional terephthalic acid and a varying amount of hydroquinone plus p-acetoxybenzoic acid. Inherent viscosities of the copolyester of the invention are 0.50 to 0.68. The copolyesters of the prior art, represented in FIGS. 1, 2 and 3 by the correlation between the ordinate and the lower abscissa, are prepared by a conventional ester interchange method, such as disclosed in Example 1 of U.S. Pat. No. 3,288,755. This copolyester is prepared from dimethyl terephthalate, ethylene glycol and varying amounts of methyl p-hyrdoxybenzoate plus hydroquinone. Inherent viscosities of the copolyesters of the prior art are 0.68 to 0.90.

Referring now to FIG. 1, it is to be observed that the flexural modulus of the copolyesters of the prior art are 3.0 to 3.5 × $10^5$ psi., which is about the flexural modulus typical for polyesters of this general type. In contrast, it is to be observed that when the range of radical (C) plus radical (D) is from about 30 to about 75 mole percent, based (C) and radical (D) the total moles of radical (B), radical (D) combined, the flexural modulus of the copolyester of the invention, containing no substantial amount of either aliphatic to aromatic or aromatic to aromatic oxygen linkages, in unobviously high when compared to the flexural modulus of the copolyesters of the prior art containing substantial amounts of aliphatic to aromatic or aromatic to aromatic oxygen linkages. Specifically, the flexural modulus in this range is at least a value in the order of about 7 × $10^5$ psi, while the flexural modulus of the copolyesters of the prior art is less than 3.5 × $10^5$ psi. Also, it is to be observed that within the range of 40 to 70 mole percent the flexural modulus is at least a value in the order of 10 × $10^5$ psi. The flexural modulus is at least a value in the order of 13 × $10^5$ psi within the range of 45 to 55 mole percent. The maximum flexural modulus occurs at about 50 mole percent where the flexural modulus is a value in the order of about 15 × $10^5$ psi.

Referring now to FIG. 2, it is to be observed that the tensile strength of the copolyesters of the prior art is about 7500 to 8500 psi., which is about the tensile strength typical for polyesters of this general type. By way of contrast, it is to be observed that when the range of radical (C) plus radical (D) is from about 30 to about 75 mole percent, based on the total moles of radical (B), radical (C) and radical (D) combined, the tensile strength of the copolyesters of the invention is unobviously high when compared to the tensile strength of the copolyesters of the prior art. Within this range this tensile strength of the copolyester of the invention is at least a value in the order of about 12,000 psi. while the tensile strength of the copolyesters of the prior art is not more than a value in the order of about 9000 psi. Within the range of about 40 to about 70 mole percent the tensile strength is a value in the order of at least about 16,000 psi. Within the range of 45 to 55 mole percent the tensile strength is a value in the order of at least about 28,000 psi. The maximum tensile strength occurs at about 50 mole percent and is a value in the order of about 30,000 psi.

Referring now to FIG. 3, it is to be observed that within the range of 30 to 75 mole percent the impact strength of the copolyesters of the invention is unobviously high when compared to the impact strength of the copolyesters of the prior art. Within this range the impact strength of the copolyesters of the invention is a value in the order of at least about 1.2 ft.-lb./in. of notch while the impact strength of the copolyesters of the prior art is less than a value in the order of 0.40 ft.-lb./in. of notch. Within the range of 40 to 70 mole percent, the impact strength of the copolyester of the invention is a value in the order of at least 1.7 ft.-lb./in. of notch. Within the range of 45 to 55 mole percent the impact strength of the copolyester of this invention is a value in the order of 5.5 ft.-lb./in. of notch. The maximum impact strength of about 6.5 ft.-lb./in. of notch occurs at a value in the order of about 50 mole percent as did the maximum values of flexural modulus and tensile strength.

Considering now the manner in which the copolyester of this invention differs from the second type of prior art, the copolyester of this invention is thought to be unobvious in view of the second type of prior art because a disclosure regarding the polyamide arts would not suggest applicability to the polyester arts.

Considering finally the manner in which the copolyester of this invention is distinguishable from the copolyester of the third type of prior art, it is to be recognized that the copolyesters of this invention are formed from ethylene glycol and a group of specific diols while the copolyesters of the third type of prior art are formed from ethylene glycol as the only type of diol. Thus, the third type of prior art teaches that ethylene glycol is the only type of diol that can be used to form a copolyester having the disclosed unobvious mechanical properties, but we have now found that while copolyesters of most diols other than ethylene glycol do not have unobvious mechanical properties, copolyesters having the disclosed unobvious mechanical properties can be prepared from the combination of ethylene glycol and a very specific class of diols which contribute radical (D) to the copolyester. Stated another way, while most diols cannot be used to replace a portion of the ethylene glycol to prepare a copolyester with the unobvious mechanical properties of the copolyester of this invention, we have found one very specific class of glycols that can be used to replace a portion of the ethylene glycol, and the resulting copolyester of the invention exhibits mechanical properties that are unobvious over the prior art.

Broadly, this invention can be described as a copolyester having an inherent viscosity of at least 0.4 and having no substantial amount of either aliphatic to aromatic oxygen linkages or aromatic to aromatic oxygen linkages, the copolyester being comprised of the following divalent radicals:

(A) 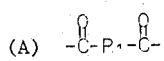

(B) —OCH2CH2O—

(C) 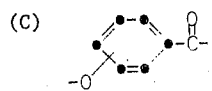

(D) —O—R2—O wherein
R1 is a divalent alicyclic radical having 4 to 20 carbon atoms, a divalent aliphatic radical having 1 to 40 carbon atoms, a divalent aromatic radical having 6 to 16 carbon atoms with the carbonyl linkages separated by at least 3 carbon atoms, with the proviso that at least 50 mole percent of R1 is the divalent aromatic radical,
R2 is a carbocyclic aromatic nucleus wherein the chain extending oxygen linkages are coaxial or parallel and are oppositely directed,
the range of radical (C) plus radical (D) is from about 30 to about 75 mole percent, based on the total moles of radical (B), radical (C) and radical (D) combined,
the amount of radical (D) is not greater than 30 mole percent, based on the total moles of radical (B), radical (C) and radical (D) combined,
in radical (C) the oxygen is linked either in the meta or para position with regard to the carbonyl group, and
at least 60 mole percent of radical (C) is the para isomer.

In one particularly preferred aspect of this invention the amount of radical (C) plus radical (D) is about 50–60 mole percent, based on the total moles of radical (B), radical (C) and radical (D) combined, and the amount of radical (D) is about 25 to about 30 percent, based on the total moles of radical (B), radical (C) and radical (D) combined, and the copolyester is comprised of the following divalent radicals:

(A) 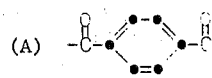

(B) —OCH2CH2O—

(C) 

(D) 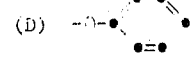

Very broadly, the copolyesters of this invention are prepared by a process comprised of two steps.

The first step of the process comprises preparing a fragmented polyester by contacting an acyloxy benzoic acid with a starting polyester having an inherent viscosity of at least about 0.2 in the presence of a quantity of dicarboxylic acid corresponding to radical (A) and a quantity of aromatic diol corresponding to radical (D). The starting polyester is formed from a dicarboxylic acid and ethylene glycol and consequently contains repeating units composed of the divalent radical remaining after the removal of the hydroxyl groups from the dicarboxylic acid, which is attached to the divalent radical remaining after removal of the hydrogen atoms from the ethylene glycol. Upon contact, the starting polyester and acyloxy benzoic acid react by acidolysis to form the fragmented polyester.

The second step of the process comprises increasing the inherent viscosity of the fragmented polyester to form the copolyester of this invention comprised of four kinds of divalent radicals. The first divalent radical, herein designated radical (A), is the divalent radical remaining after the removal of the hydroxyl groups from a dicarboxylic acid and comes from the dicarboxylic portion of the starting polyester and the dicarboxylic acid present when the starting polyester is contacted with the acyloxy benzoic acid. The second divalent radical, herein designated radical (B), comes from the ethylene glycol portion of the starting polyester and is the divalent radical remaining after removal of the hydrogen atoms from the ethylene glycol. The third divalent radical, herein designated radical (C), comes from the acyloxy benzoic acid and is the divalent radical remaining after removal of the acyl and hydroxy groups from the acyloxy benzoic acid. The fourth radical, herein designated radical (D), comes from the aromatic diol that is present when the started polyester is contacted with the acyloxy benzoic acid.

The starting polyester is comprised of repeating units corresponding to the formula

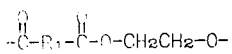

where $R_1$ is the same as described earlier and will be recognized as the divalent radical remaining after removal of the carboxyl groups from the dicarboxylic acid used to prepare the starting polyester. Examples of dicarboxylic acids that can be used to prepare the starting polyester include malonic; dimethylmalonic; succinic; glutaric; adipic; 2-methyladipic; trimethyladipic; pimelic; 2,2-dimethylglutaric; 3,3-diethylsuccinic; azelaic; sebacic; suberic; 1,3-cyclopentanedicarboxylic; 1,3-cyclohexanedicarboxylic; 1,4-cyclohexanedicarboxylic; terephthalic; isophthalic; 4-methylisophthalic; t-butylisophthalic; 2,5-norbornanedicarboxylic; 1,4-naphthalic; diphenic; 4,4'-methylenedibenzoic; diglycolic; 2,5-naphthalenedicarboxylic; 2,6-naphthalenedicarboxylic; 2,7-naphthalenedicarboxylic; bibenzoic acid; bis(p-carboxyphenyl) methane; ethylene-bis-p-benzoic acid; and 1,5-naphthalene dicarboxylic acids. If desired, a halogenated aromatic dicarboxylic acid may be used such as dichloroterephthalic acid or dibromoterephthalic acid. Preferably not over 25 mole percent halogenated aromatic dicarboxylic acid is used. Preferably $R_1$ is a divalent aromatic radical having 6 carbon atoms. If desired, the starting polyester can be prepared from a suitable ester, such as dimethyl terephthalate, instead of the dicarboxylic acid.

Ethylene glycol is the diol used to form the starting polyester of this invention.

The starting polyesters of this invention can be prepared by conventional processes well known in the art, such as direct esterification or ester interchange followed by polycondensation.

The acyloxy benzoic acid that reacts with the starting polyester and provides the radical (C) in the final copolyester corresponds to the structure

or

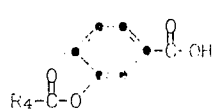

wherein $R_4$ is a monovalent alkyl radical of 1 to 8 carbon atoms or a monovalent aromatic radical of 6 carbon atoms and at least 60 mole percent of the acyloxy benzoic acid is the para isomer.

In another embodiment $R_4$ is a monovalent alkyl radical having 1 to 8 carbon atoms and in another embodiment $R_4$ is a monovalent alkyl radical having 1 to 4 carbon atoms. In still another embodiment at least 90 mole percent of the acyloxy benzoic acid is the para isomer. Preferably, $R_4$ is a monovalent alkyl radical having one carbon atom in which case the acyloxy benzoic acid is p-acetoxybenzoic acid.

Examples of suitable acyloxy benzoic acids include meta and para-acetoxy benzoic acid; meta- and para-propionyloxy benzoic acid; meta- and para-butyryloxy benzoic acid; and meta- and para-benzoyloxybenzoic acid.

The acyloxy benzoic acids can be prepared by conventional processes, such as reaction between p-hydroxybenzoic acid and a carboxylic anhydride, such as acetic anhydride. Other processes for preparation of the acyloxy aromatic carboxylic acids are well known in the art.

The aromatic diol that contributes radical (D) is a conventional aromatic diol having a carbocyclic nucleus and having the chain extending oxygen linkages coaxial or parallel and oppositely directed.

Examples of specific structures that can be used for the carbocyclic nucleus of the aromatic diol are divalent radicals selected from the group consisting of

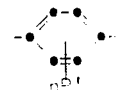

wherein R' is halogen or a monovalent alkyl radical having one to ten carbon atoms and $n$ is 0, 1, 2, 3 or 4,

wherein R'' is halogen or a monovalent alkyl radical having one to ten carbon atoms and $m$ is 0, 1, 2, 3 or 4,

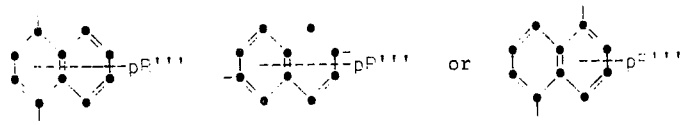

wherein R''' is halogen or a monovalent alkyl radical having one to ten carbon atoms and $p$ is 0, 1, 2, 3 or 4.

Even more preferably the carbocyclic aromatic nucleus is a divalent radical selected from the group consisting of

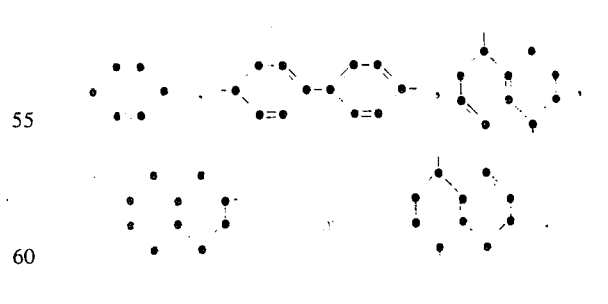

Most preferably the carbocyclic aromatic nucleus is

Examples of suitable carbocyclic aromatic diols include hydroquinone, 2-chlorohydroquinone, 2,6-dichlorohydroquinone, 2,3,5-trifluorohydroquinone, 2,6-dibromohydroquinone, 2-ethylhydroquinone, 2-ditertiarybutylhydroquinone, 4,4'-dihydroxybiphenyl, 2-methylhydroquinone, 1,5-naphthalene diol, 2,6-naphthalene diol, 1,4-naphthalene diol.

As disclosed above, the carbocyclic nucleus of the aromatic diol that contributes radical (D) can bear halogen or alkyl substituents. These substituents should be nonreactive during the polymerization and also should be thermally stable during subsequent processing of the copolyester into useful articles. Such reactivity is undesirable in that it may cause cross-linking of the copolyester and may adversely affect the properties of useful articles prepared from the polyester. Preferred substituents are chloro, bromo and lower alkyl, including specifically methyl, ethyl, isopropyl and n-propyl. Other suitable substituents which are nonreactive during the polymerization will be evident to those skilled in the art and are contemplated herein provided such do not adversely affect the desired properties of the copolyester, due to factors such as cross-linking and steric hindrance. Generally, it is preferred that no more than two, more preferably no more than one, substituents be present on the nucleus of the aromatic diol. However, more than two such substituents can often be present if the substituents are a relatively small group, such as methyl or isopropyl.

Although broadly the amount of radical (D) is not greater than 30 mole percent, preferably the amount of radical (D) is about 25 to about 30 percent, based on the total moles of radical (B), radical (C) and radical (D) combined.

As described above, the first step of the process for preparing the copolyesters of the invention involves first preparing the fragmented polyester by contacting the starting polyester with the acyloxy benzoic acid in the presence of the aromatic diol and dicarboxylic acid. The thermodynamic conditions that can be used in the first step can vary widely depending on the desires of the practitioner of the invention. Although other temperatures can be used, a temperature range of about 200°C. to about 290°C. can be used in one embodiment. In another embodiment the temperature range of 240°C. to 275°C. can be used. Temperatures below about 200°C. can be undesirable since the reaction rate between the acyloxy benzoic acid and the starting polyester will be lowered. Although a wide variety of pressures can be used to prepare the fragmented polyester, atmospheric pressure is often used. A wide variety of times can be used to prepare the fragmented polyester. Of course, the starting polyester and the acyloxy benzoic acid must be in contact for a long enough period of time to react to form the fragmented polyester.

In accordance with the first step, the acyloxy benzoic acid can be contacted with the starting polyester in the presence of the dicarboxylic acid and the aromatic diol using a wide variety of techniques well known in the art. In most instances all of the materials are solids at standard temperature and pressure, in which case the solids can be mixed and heated until molten. In other instances all of the materials can be in liquid form, in which case the liquids can be contacted by admixing.

As described above, the second step of the process for preparing the copolyester of the invention involves increasing the inherent viscosity of the fragmented polyester to at least 0.4. The increase in inherent viscosity of the fragmented polyester can be accomplished by any one of several conventional methods well known in the art to build up the molecular weight of linear polyesters. When the fragmented polyester is a hot, molten material, the fragmented polyester can be conveniently built up by a technique similar to the polycondensation step in the production of poly(ethylene terephthalate). In this technique a subatmospheric pressure is created above the fragmented polyester and the fragmented polyester is heated while polycondensation products are removed overhead. The fragmented polyester can be stirred if desired. When the fragmented polyester takes the form of a solid, molecular weight build-up can be conveniently accomplished by fluidization techniques well known in the art such as are used to build up the molecular weight of poly(ethylene terephthalate).

The thermodynamic conditions that can be used in the second step of preparing the copolyester of the invention by increasing the inherent viscosity of the fragmented polyester can also vary widely depending on the desires of the practitioner of the invention. Although other temperatures can be used, in one embodiment a temperature in the range of about 230° to about 350°C. can be used, and in another embodiment a temperature in the range of 260° to 290°C. can be used. Temperatures above about 350°C. can be undesirable since temperatures this high may cause degradation of the polymer. Temperatures below 230°C. produce less desirable rates of increase in the inherent viscosity of the fragmented polyester. Although other pressures can be used, a pressure in the range of about 800 mm. to 0.05 mm. Hg can be conveniently used. It is particularly convenient to conduct the first step of the invention at approximately atmospheric pressure and then start the second step of the invention at the same pressure and gradually reduce the pressure as the inherent viscosity of the fragmented polyester builds up. The time that can be used is not critical but, of course, sufficient time must be allowed to build up the fragmented polyester to the inherent viscosity desired for the copolyester of the invention.

The inherent viscosity of the copolyester of this invention is at least 0.4, but can vary widely upward from 0.4. In one embodiment the inherent viscosity of the copolyester is at least 0.5. The inherent viscosity of the copolyester can, if desired, be increased still further to an inherent viscosity of 0.6, 0.7, 1.0, or even higher, using techniques well known in the art for increasing the molecular weight of linear polyesters.

The inherent viscosity of the polyesters of this invention is measured at 25°C. using 0.50 gram of polymer per 100 ml. of a solvent composed of 60 volumes of phenol and 40 volumes of tetrachloroethane.

Although the first and second steps of the process for preparing the copolyester of this invention can be conducted without use of a catalyst other than the catalyst in the starting polyester itself, a catalyst such as cobalt may be used in the second step to facilitate inherent viscosity build-up of the fragmented polyester.

In a typical example of the process for preparing the copolyesters of this invention granular poly(ethylene terephthalate) having an inherent viscosity of about 0.6, terephthalic acid, hydroquinone diacetate and p-acetoxybenzoic acid are placed in a stirred reaction vessel and heated to about 275°C. for about one hour or until most of the acetic acid has distilled from the vessel and a low melt viscosity fragmented polyester has been obtained. A vacuum is then applied and stirring continued until the inherent viscosity of the copolyester prepolymer is built up to form the copolyester having an inherent viscosity of about 0.85.

The copolyesters of this invention are useful for preparing molded objects. As noted earlier, molded objects of the copolyesters wherein the range of radical (C) plus radical (D) is from about 30 to about 75 mole percent, based on the total moles of radical (B), radical (C) and radical (D) combined, exhibit mechanical properties which are unobvious over the prior art.

The copolyesters of the invention are also useful in preparing films, fibers, foamed plastic products, coatings and adhesives.

The copolyesters of this invention are used to prepare useful articles using conventional methods and conventional apparatus. For instance, the copolyesters can be formed into fibers by conventional melt spinning techniques and subsequently drafted, heatset and further processed according to techniques well known in the art. The copolyesters can be injection molded using conventional equipment and techniques.

The copolyesters of this invention also may contain nucleating agents, fillers, pigments and such other additives as may be desired.

EXAMPLE 1

This example illustrates preparation of a typical copolyester of this invention comprised of terephthalic acid, ethylene glycol, 4-acetoxybenzoic acid, and hydroquinone diacetate wherein the amount of both the divalent radical contributed to copolyester from the 4-acetoxybenzoic acid and the divalent radical contributed to the copolyester from the hydroquinone is 30 mole percent, based on the total moles of these radicals plus the divalent radical contributed from terephthalic acid.

In accordance with the first step of preparing the copolyester of this invention, a fragmented polyester is prepared by placing the following components into a one-neck 500-ml. round-bottom flask:

38.4 g. (0.2 moles) polyethylene terephthalate containing conventional zinc/antimony catalyst and having an I.V. of approximately 0.60,
27.0 g. (0.15 moles) 4-acetoxybenzoic acid,
24.9 g. (0.15 moles) terephthalic acid, and
29.7 g. (0.15 moles) hydroquinone diacetate.

The flask is fitted with a stirrer and condensate take-off and immersed into a thermostated Wood's metal bath at 150°C. The temperature is raised to 270°C. over a period of approximately 20 minutes. After approximately 5 minutes at 270°C., the reaction starts and acetic acid is taken off. After approximately 20 minutes at 270°C., the temperature is raised to 290°C. and the reaction continues for approximately 30 minutes.

In accordance with the second step of preparing the copolyester of the invention by increasing the inherent viscosity of the fragmented polyester, a vacuum is then applied at approximately 0.10 mm. for 2 hours and 10 minutes and polycondensation products are removed overhead. The resultant copolyester of the invention has an I.V. of 0.70. The mechanical properties of the copolyester correspond to those disclosed for copolyesters of this invention.

Substantially the same results are achieved when the amounts of 4-acetoxybenzoic acid and hydroquinone diacetate are varied in accordance with the scope of the invention.

Substantially the same results are achieved when other aromatic diols within the scope of the invention are used in place of hydroquinone.

EXAMPLE 2

This example illustrates the manner in which the copolyesters of this invention can be regarded as unobvious over the third type of prior art which discloses copolyesters containing radicals (A), (B) and (C).

As disclosed earlier, the copolyesters of the invention are thought to be unobvious over this type of prior art because applicants have discovered a limited class of diols that can be used in conjunction with ethylene glycol to prepare copolyesters having unobvious mechanical properties. Thus, while from the chemical reactivity standpoint substantially any diol can be used to form a copolyester similar to the copolyesters of this invention, only when the specific class of diols corresponding to radical (D) is used in conjunction with ethylene glycol does the copolyester have the disclosed unobvious mechanical properties.

In order to illustrate that copolyesters prepared from ethylene glycol and most diols do not have the unobvious mechanical properties of the copolyesters of this invention, a first group of copolyesters is prepared from typical aliphatic diols, a second group of copolyesters is prepared from typical cycloaliphatic diols, and a third group of copolyesters is prepared from aromatic diols beyond the scope of applicants' invention.

The first group of copolyesters is prepared from polyethylene terephthalate, terephthalic acid, 4-acetoxybenzoic acid and various aliphatic diols substantially in accordance with the procedure disclosed in Example 1 for preparing the copolyesters of the invention. Thus, each copolyester differs from the copolyester of invention in that the aromatic diol in each copolyester is replaced by the following aliphatic diols:

trimethylene glycol
1,3-butanediol
1,4-butanediol
1,4-butylenediol
1,5-pentanediol
hexamethylene glycol
heptamethylene glycol
1,10-decanediol
neopentyl glycol
2,2,4-trimethylene-1,3-pentanediol
2,2-dimethyl-1,3-propanediol
3-ethyl-2-isobutyl-1,3-propanediol While the mechanical properties of each of the copolyesters prepared from these diols varied widely, in all cases the mechanical properties are substantially as expected and generally are not higher than the mechanical properties of a typical polyester, such as polyethylene terephthalate.

The second group of copolyesters is prepared from polyethylene terephthalate, terephthalic acid, 4-acetoxybenzoic acid and various cycloaliphatic diols substantially in accordance with the procedure disclosed in Example 1 for preparing the copolyesters of the invention. Thus, each copolyester differs from the copolyester of the invention in that the aromatic diol is replaced by the following cycloaliphatic diols:

1,4-cyclohexanediol
1,2-cyclohexanedimethanol
1,3-cyclohexanedimethanol
1,4-cyclohexanedimethanol
2,2,4,4-tetramethyl-1,3-cyclobutanediol As in the case of the first group of copolyesters where aliphatic diols are used, the mechanical properties of these copolyesters varied widely but are substantially as expected and are generally not higher than those of a typical polyester, such as polyethylene terephthalate.

The third group of copolyesters is prepared from polyethylene terephthalate, terephthalic acid, 4-acetoxybenzoic acid and various aromatic diols beyond the scope of the aromatic diols of the invention that contribute radical (D). Following substantially the procedure of Example 1 copolyesters are prepared which differ from the copolyesters of the invention in that the aromatic diol that contributes radical (D) is replaced by the following aromatic diols that are beyond the scope of applicants' invention:

bisphenol A
resorcinol
o-xylenediol
m-xylenediol
4,4'-thiodiphenol
4,4'-methylenediphenol
4,4'-sulfonyldiphenol
4,4'-oxydiphenol
4,4'-(2-norbornylidene)-diphenol
4,4'-(hexahydro-4,7-methanoindan-5-ylidene)diphenol As in the case of the copolyesters of the first and second groups, the mechanical properties of these copolyesters vary widely, but in all cases the mechanical properties are generally as expected and are not higher than a typical polyester, such as polyethylene terphthalate.

When aromatic diols of the specific type that contribute radical (D) are used in place of the above aliphatic, cycloaliphatic and aromatic diols, the mechanical properties of the resulting copolyester of the invention are unobvious in view of the prior art.

Although the invention has been described in considerable detail with particular reference to certain preferred embodiments thereof, variations and modifications can be effected within the spirit and scope of the invention. We claim:

1. A copolyester having an inherent viscosity of at least 0.4 measured at 25°C. using 0.50 gram of polymer per 100 ml. of a solvent composed of 60 volumes of phenol and 40 volumes of tetrachloroethane and having no substantial amount of either aliphatic to aromatic oxygen linkages or aromatic to aromatic oxygen linkages, the copolyester being comprised of the following divalent radicals:

(A) $-\overset{O}{\underset{}{C}}-R_1-\overset{O}{\underset{}{C}}-$ (B) $-OCH_2CH_2O-$ (C) 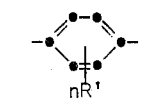

(D) $-O-R_2-O-$ wherein
- $R_1$ is a divalent alicyclic radical having 4 to 20 carbon atoms, a divalent aliphatic radical having 1 to 40 carbon atoms, or a divalent aromatic radical having 6 to 16 carbon atoms with the carbonyl linkages separated by at least 3 carbon atoms, with the proviso that at least 50 mole percent of $R_1$ is the divalent aromatic radical,
- $R_2$ is a carbocyclic aromatic nucleus wherein the chain extending oxygen linkages are coaxial or parallel and are oppositely directed,
- the range of radical (C) plus radical (D) is from about 30 to about 75 mole percent, based on the total moles of radical (B), radical (C) and radical (D) combined,
- the amount of radical (D) is not greater than 30 mole percent, based on the total moles of radical (B), radical (C) and radical (D) combined,
- in radical (C) the oxygen is linked either in the meta or para position with regard to the carbonyl group, and
- at least 60 mole percent of radical (C) is the para isomer.

2. The copolyester of claim 1 wherein $R_2$ is a divalent radical selected from the group consisting of

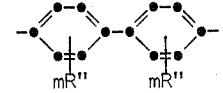

wherein R' is halogen or a monovalent alkyl radical having one to ten carbon atoms and $n$ is 0, 1, 2, 3 or 4,

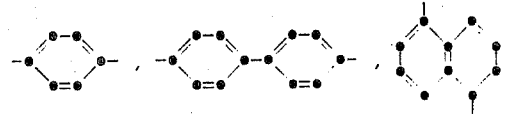

wherein R'' is halogen or a monovalent alkyl radical having one to ten carbon atoms and $m$ is 0, 1, 2, 3 or 4, wherein R''' is halogen or a monovalent alkyl radical having one to ten carbon atoms and $p$ is 0, 1, 2, 3 or 4, at least 90 mole percent of radical (C) is the para isomer, and the range of radical (C) plus radical (D) is from 40 to 70 mole percent.

3. The copolyester of claim 2 wherein $R_2$ is a divalent radical selected from the group consisting of 4. The copolyester of claim 3 wherein $R_1$ is a divalent aromatic radical having 6 to 16 carbon atoms.

5. The copolyester of claim 4 wherein $R_1$ is a divalent aromatic radical having 6 carbon atoms.

6. The copolyester of claim 5 wherein radical (A) is 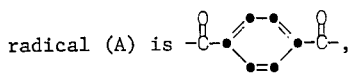, radical (C) is 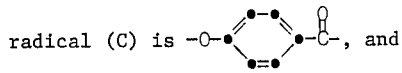, and radical (D) is 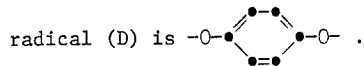.

7. The copolyester of claim 6 wherein the range of radical (C) plus radical (D) is from 45 to 55 mole percent.

8. A copolyester having an inherent viscosity of at least 0.4 measured at 25°C using 0.50 gram of polymer per 100 ml. of a solvent composed of 60 volumes of phenol and 40 volumes of tetrachloroethane and having no substantial amount of either aliphatic to aromatic oxygen linkages or aromatic to aromatic oxygen linkages, the copolyester being comprised of the following divalent radicals:

(A) 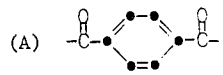

(B) $-OCH_2CH_2O-$ (C) 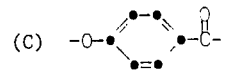

(D) 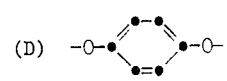

wherein
the amount of radical (C) plus radical (D) is about 45 to 55 mole percent, based on the total moles of radical (B), radical (C) and radical (D) combined, and
the amount of radical (D) is about 25 to about 30 percent, based on the total moles of radical (B), radical (C) and radical (D) combined.

* * * * *